United States Patent
Xie et al.

(10) Patent No.: US 11,822,791 B1
(45) Date of Patent: Nov. 21, 2023

(54) WRITING DATA TO LOWER PERFORMANCE STORAGE TIERS OF A MULTI-TIER STORAGE SYSTEM

(71) Applicant: International Business Machines Corporation, Armonk, NY (US)

(72) Inventors: Qiang Xie, Shanghai (CN); Hui Zhang, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 72 days.

(21) Appl. No.: 17/663,027

(22) Filed: May 12, 2022

(51) Int. Cl.
G06F 3/06 (2006.01)

(52) U.S. Cl.
CPC ............ G06F 3/0611 (2013.01); G06F 3/064 (2013.01); G06F 3/0607 (2013.01); G06F 3/0656 (2013.01); G06F 3/0679 (2013.01)

(58) Field of Classification Search
CPC ...... G06F 3/0607; G06F 3/0611; G06F 3/064; G06F 3/0656; G06F 3/06
See application file for complete search history.

(56) References Cited

U.S. PATENT DOCUMENTS

| | | | |
|---|---|---|---|
| 8,229,897 B2 | 7/2012 | Cannon | |
| 9,026,765 B1 | 5/2015 | Marshak | |
| 9,213,721 B1 | 12/2015 | Faibish | |
| 9,424,263 B1 | 8/2016 | Aston | |
| 10,339,455 B1 * | 7/2019 | Parush-Tzur | G06F 3/061 |
| 10,360,155 B1 | 7/2019 | Thomas | |
| 11,048,590 B1 * | 6/2021 | Sapuntzakis | G06F 3/067 |
| 2010/0199036 A1 | 8/2010 | Siewert | |
| 2020/0073723 A1 * | 3/2020 | Thomas | H04L 41/5022 |
| 2020/0133857 A1 | 4/2020 | Randolph | |

OTHER PUBLICATIONS

Zhang et al., "Adaptive Data Migration in Multi-tiered Storage Based Cloud Environment", 2010 IEEE 3rd International Conference on Cloud Computing, Jul. 10, 2010, 8 pages.

* cited by examiner

Primary Examiner — Khoa D Doan
(74) Attorney, Agent, or Firm — Stephen R. Yoder

(57) ABSTRACT

Efficient writing to lower-performance storage tiers of a multi-tier storage system evaluates user intention when determining a write process that ultimately writes target data to a priority storage tier according to the user intention. Temporary high-performance storage tiers serve as coordinator tiers to achieve the efficient writing process for writing substantial or massive datasets to local storage.

18 Claims, 8 Drawing Sheets

WRITING DATA TO LOWER PERFORMANCE STORAGE TIERS OF A MULTI-TIER STORAGE SYSTEM

BACKGROUND

The present invention relates generally to the field of data storage, and more particularly to writing data to storage in a multi-tier storage system.

Users often desire to write data to their local storage system. For example, when doing disaster recovery, loading backed up data, or saving large amounts of data from IoT devices for later analysis. Typically, the faster the data is written, the better the user experience.

To increase the speed of the reads and/or writes, faster SSD (solid state drives) are used. Users often use a multi-tiered storage system to address the cost differential between upper tier performance and lower tier performance. The high-performance storage tiers of a multi-tier storage system provide better read/write performance, but they are more expensive than the low-performance storage tier. Accordingly, the capacity of the high-performance tiers is often smaller than the low-performance tier, which doesn't have the as powerful of a read/write performance. Typically, the lower tier storage capacity is relatively larger than the upper tier storage because it is a relatively lower cost option. When users write large amounts of data, for example, from IoT (internet of things) devices to a multi-tier storage system, the low-performance tier is often selected in order to leave the high-performance tier available for more critical jobs.

SUMMARY

In one aspect of the present invention, a method, a computer program product, and a system includes: identifying a logical dataset of storage in a multi-tier storage system; setting up a logical configuration map of the logical dataset and a priority storage tier having a first performance level; selecting a coordinator storage tier having a second performance level in the multi-tier storage system; comparing the first performance level of the priority storage tier to the second performance level; and performing a write process according to the relative performance level of the first performance level with respect to the second performance levels.

Another aspect of the present invention includes: allocating a physical memory chunks to both the priority tier and the coordinator tier; building an extended logical configuration mapping for the logical dataset, the priority tier allocation, and the coordinator tier allocation; writing the logical dataset to the coordinator tier according to the allocation; copying the logical dataset from the coordinator tier to the priority tier; and responsive to the copying being completed, releasing the physical chunk allocation from the coordinator tier.

DETAILED DESCRIPTION

Figure 1:
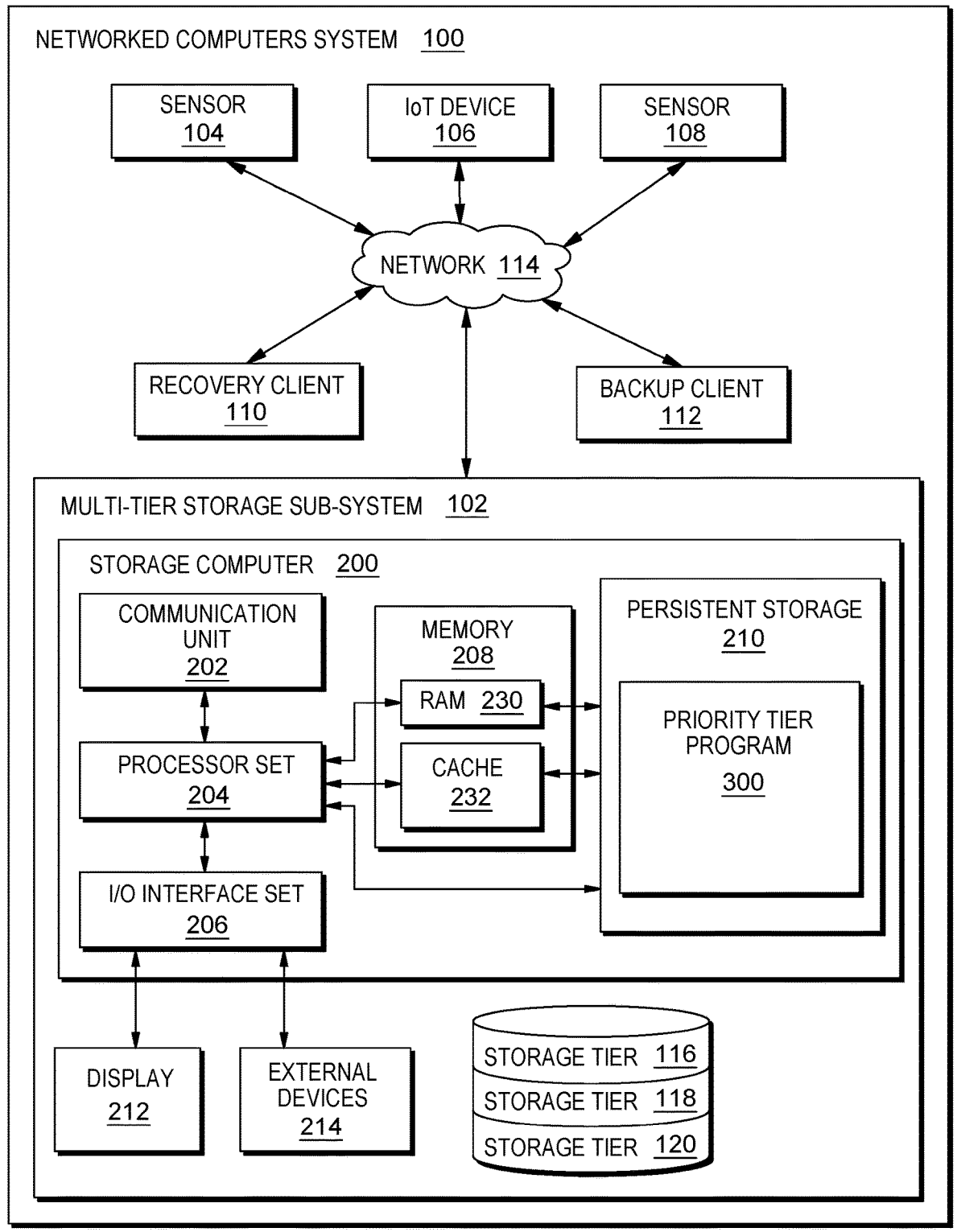
FIG. 1 is a schematic view of a first embodiment of a system according to the present invention.

Efficient writing to lower-performance storage tiers of a multi-tier storage system evaluates user intention when determining a write process that ultimately writes target data to a priority storage tier according to the user intention. Temporary high-performance storage tiers serve as coordinator tiers to achieve the efficient writing process for writing substantial or massive datasets to local storage.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium, or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network, and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture, including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present invention will now be described in detail with reference to the Figures. FIG. 1 is a functional block diagram illustrating various portions of networked computers system 100, in accordance with one embodiment of the present invention, including: multi-tier storage sub-system 102; sensor device sub-system 104, 108; sensor data store 105; internet of things (IoT) device sub-system 106; disaster recovery client sub-system 110; data backup client sub-system 112; communication network 114; storage tiers 116, 118, 120; storage computer 200; communication unit 202; processor set 204; input/output (I/O) interface set 206; memory device 208; persistent storage device 210; display device 212; external device set 214; random access memory (RAM) devices 230; cache memory device 232; priority tier program 300; and priority tier reference table 302.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage, and control certain software functions that will be discussed in detail below.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware component within a system. For example, the communications fabric can be implemented, at least in part, with one or more buses.

Memory 208 and persistent storage 210 are computer readable storage media. In general, memory 208 can include any suitable volatile or non-volatile computer readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions, and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either, or both, physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with computer 200. For example, I/O interface set 206 provides a connection to external device set 214. External device set 214 will typically include devices such as a keyboard, keypad, a touch screen, and/or some other suitable input device. External device set 214 can also include portable computer readable storage media such as, for example, thumb drives, portable optical or magnetic disks, and memory cards. Software and data used to practice embodiments of the present invention, for example, program 300, can be stored on such portable computer readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the present invention. However, it should be appreciated that any particular program nomenclature herein is used merely for convenience, and thus the present invention should not be limited to use solely in any specific application identified and/or implied by such nomenclature.

Priority tier program 300 operates to efficiently direct datasets to preferred, or priority, storage tiers by employing helpful characteristics of relatively high-performance storage tiers as temporary storage locations. Evaluation of the priority tier with respect to other available storage tiers drives development of an efficient write process for a given set of data. Aspects of some embodiments of the present invention are directed to writing substantial or massive datasets to local storage.

Some embodiments of the present invention recognize the following facts, potential problems and/or potential areas for improvement with respect to the current state of the art: (i) the faster the storage is, the more expensive it is to use and/or deploy it; and (ii) it is generally slower to write data to a low-performance tier than to write data to a high-performance tier.

Hybrid storage systems are widely used today. These systems usually consist of a small number of expensive, high-performance disks (such as SSD) and a large number of lower cost and lower performance disks (for example, HDD and Tapes). Due to the physical characteristics of the disks, it takes a longer time to write data to the lower performance disks. The more data to be written, the longer the time to write. Regardless of the disadvantages of low-performance disks, they are often deployed for storage. For example, when a user restores backup data, the amount of the data can be very large, but most of the data is oftentimes not so urgently needed. The user may choose to write the backup data to low-performance disks. In that way the user avoids taking up high-performance disk space. It will take a very long time before user can use these restored data. Therefore, determining how to quickly write large amounts of data to the low-performance disks of a hybrid storage system is an important challenge.

Some embodiments of the present invention are directed to accelerating the write process of a hybrid storage system, especially when writing data to the low-performance disks. Accelerating includes formalizing the storage tiers of the storage system and mapping user priority to the several tiers to organize the data into a sequence of tagged data chunks. The storage system selects a storage tier as a coordinator tier. When a data chunk arrives for storage, the storage system compares the desired tier of the data chunk determined from the user priority with the coordinator tier. If the desired tier is faster or as fast as the coordinator tier, the data chunk is written directly to the coordinator tier. If the desired tier is slower than the coordinator tier, a temporary data chunk is allocated from the coordinator tier and the data is written to it. When the temporary data chunk is full, writing moves to a subsequent data chunk. While the data is being written to the temporary data chunk(s), a copy agent is started to copy data from the temporary data chunk to the final data chunk allocated from the desired tier. In that way, the data is written to the temporary data chunks allocated from the coordinator tier sequentially, and multiple copy agents copy data from the temporary data chunks to final data chunks allocated from the desired tier concurrently. Essentially, the sequential write task is converted to concurrent copy tasks to accelerate the overall task.

According to some embodiments of the present invention, user priority regarding the distribution of data being written to disk is a factor in determining to which storage tier performance level to write the data. Table 1, below, illustrates how prioritized writing to various storage tiers of a storage system may be implemented according to the need for distributing the data. Where there is no information regarding the priority for data distribution, the default tier is used, which is assigned according to the space allocation policy of the storage system.

TABLE 1

Mapping of Priority to Storage Tiers Based on Performance Level.

| DATA PRIORITY | ASSIGNED STORAGE TIER |
| --- | --- |
| Hot | Tier 0 (Fastest Tier) |
| Medium | Tier 1 (Mid-level Tier) |
| Cold | Tier 2 (Slowest Tier) |
| None | Default Tier |

According to some embodiments of the present invention, the user may apply a percentage level to establish the priority for a particular set of data. For example, the user may set the whole data file to "Hot," or the user may establish "30% Hot, 50% Medium, and 30% Cold" as the data priority. Table 2 illustrates how data may be organized by priority to determine how data is written to the storage system. For the chunked array, l1 represents a chunk having the same size as an extent in the corresponding storage system. For the extended chunk array, by applying the desired tier to each chunk according to the user priority, each chunk is sent to the storage system.

TABLE 2

Discretization of Multi-level Storage Priority.

| DATA STATUS | ARRAY TYPE | DATA ARRAY |
| --- | --- | --- |
| Raw Data | Byte Array | [b1, b2, . . . bn] |
| Chunked Data | Chunk Array | [l1, l2, . . . ln] |
| Final Chunked Data | Extended Chunk Array | [(l1, t1), (l2, t2), . . . (ln, tn) |

Some embodiments of the present invention are directed to a method for increasing the speed of writing to the low-performance storage tier. Some aspects of the present invention operate to formalize the purpose of data distribution when a user writes data to the multi-tiered storage system. Using the logical configuration of the storage system to maintain a final-chunk to temporary-chunk mapping, where the "final" chunk of data is in a low-performance tier and the "temporary" chunk of data is in a high-performance tier.

Some embodiments of the present invention convert sequential writes from the host to concurrent copy tasks in the storage system. This can be achieved by separating the whole write into multiple concurrent threads in some cases, but for each thread, the writing is sequential in logic. In that way, the host writes data to the temporary chunk in a high-performance tier of the storage system with reference to the above-mentioned sequential mode. The storage system then starts a predictable number of copy agents to copy the data from the temporary chunks to the final chunks.

The temporary chunks that are created are recyclable. The number of the temporary chunks and copy tasks are calculated by the ratio of the time to copy data from the high-performance tier to the low-performance tier compared to the time to write data to the high-performance tier.

The multi-tiered storage system virtualizes the physical drives. The storage is organized as continuous chunks have the same size, such as in 16 MB or 1 GB. The continuous chunks are divided among all the storage drives and are controlled by different controllers to maximum the I/O throughput. Each continuous chunk of data contains a range of continuous physical addresses. The storage system has a logical configuration map that translates the logical address into the physical address or logical block address (LBA) when the storage system writes the data to drives. These physical addresses are also mapped to different logical addresses via the logical configuration map. When writing data, the data chunks are written to continuous logical addresses. The storage system converts the logical addresses to physical addresses via the logical configuration and finally writes the data to the chunks in the various target drives.

Before the user writes a data stream/file to the storage system, the user may know a heat level or a priority level of different portions of the data stream/file, so it prefers to write data stream/file parts to different storage tiers based on the data heat. The user could use a percentage bar to set the heat. For example, the user can set the whole file as Hot or as 30% Hot, 50% Medium, and 20% Cold. Discretization can be utilized when the numbers of intention and tiers do not match. Discretization is the process through which continuous variables are transformed into a discrete form by creating a set of contiguous intervals that go across the range of values of the desired variable. For example, if there are only two tiers in the storage system, Tier 0 and Tier 1, then Hot is stored in Tier 0, (Medium, Cold) is stored in Tier 1.

The data stream could be divided into a chunked array such as [l1, l2, . . . ln], where ln is a chunk of data and its size could be the same as an extent in the storage system, for example, 16 MB. An extended chunked array can then be constructed [(l1, t1), (l2, t2), . . . (ln, tn)]. Where tn is the desired tier number of chunk n. For each original chunk of data, add a tier number corresponding to the intention of the user. The data chunks may then be sent to the storage system.

Figure 2:
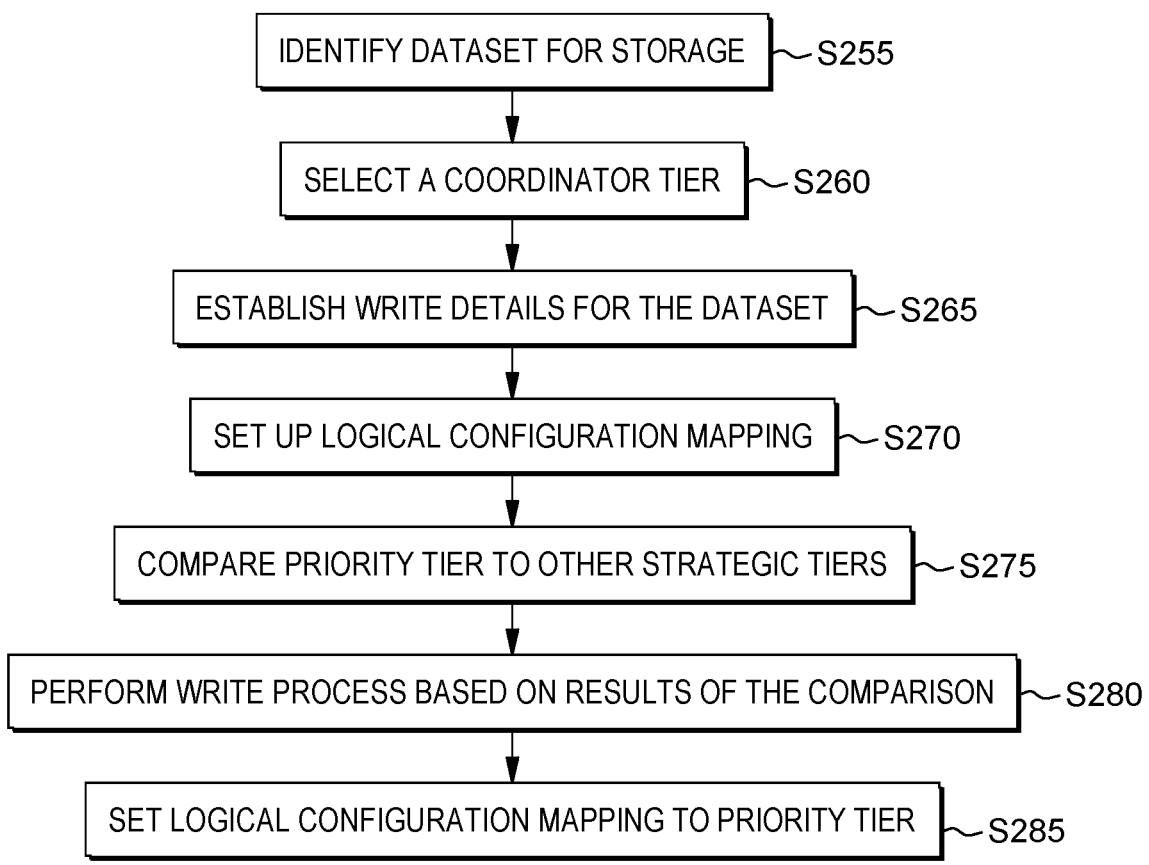
FIG. 2 is a flowchart showing a first method performed, at least in part, by the first embodiment system.
Figure 3:
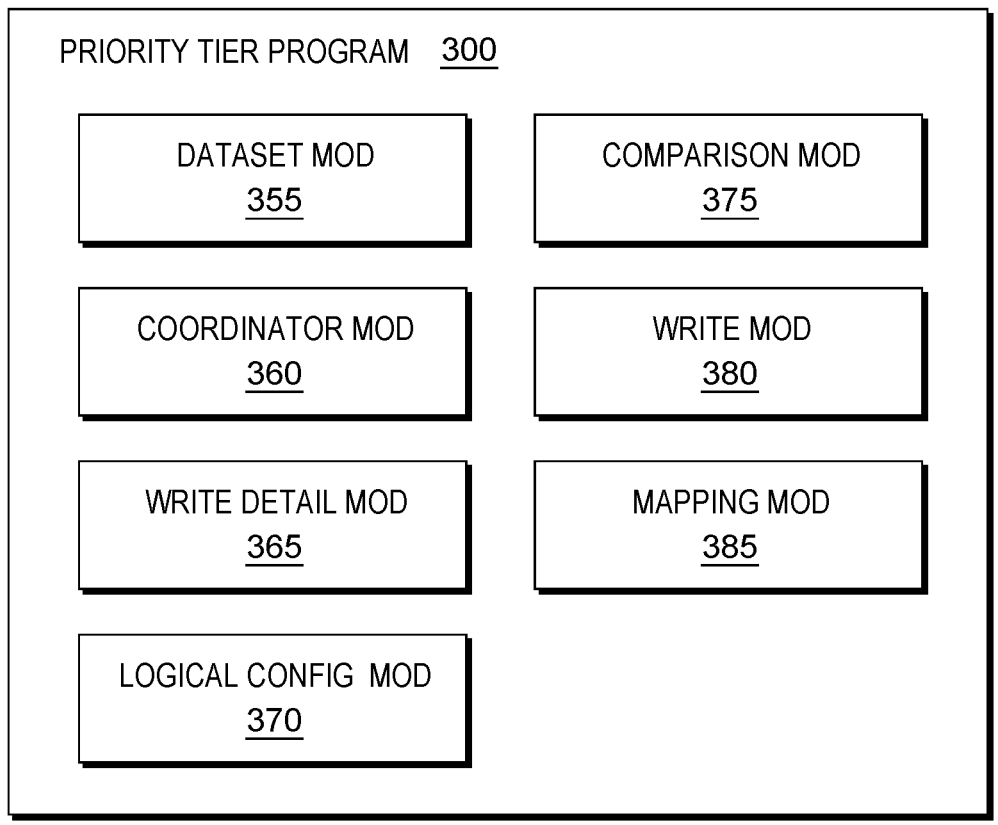
FIG. 3 is a schematic view of a machine logic (for example, software) portion of the first embodiment system.

FIG. 2 shows flowchart 250 depicting a first method according to the present invention. FIG. 3 shows program 300 for performing at least some of the method steps of flowchart 250. This method and associated software will now be discussed, over the course of the following paragraphs, with extensive reference to FIG. 2 (for the method step blocks) and FIG. 3 (for the software blocks).

Processing begins at step S255, the dataset module ("mod") 355 identifies a dataset for storage. In this example, the dataset is received from a user with instructions to store the data in a priority storage tier. Alternatively, periodic identification processes identify datasets for storage. The priority storage tier may be identified in several ways now known or to be known in the future including metadata associated with the identified dataset, input received from a user, and a table identifying priority tiers for various types of datasets, the identified dataset being a type of dataset among the listed types.

Processing proceeds to step S260, where coordinator mod 360 selects a coordinator tier within the multi-tier storage system. Various storage tiers are mentioned in this disclosure. As discussed herein, a default storage tier is the tier identified by an available logical configuration map based on the particular storage system policy. The identified dataset to be stored may be assigned a particular storage tier or the desired performance level may be input by a user or otherwise designated. The designated storage tier performance level is referred to herein as the priority storage tier. The priority tier may also be referred to as the intended tier, meaning it is the storage tier having the performance level in which the dataset is intended to be stored. The available performance tier exhibiting the best performance is referred to herein as the coordinator tier. The coordinator storage tier may happen to have the same performance level as the default tier and/or it may be the same performance level as the priority tier. In this example, the coordinator tier is storage tier 120, shown in FIG. 1.

Processing proceeds to step S265, where write detail mod 365 establishes the write details for the dataset. In this example, multi-tier storage sub-system 102 provides write details including: (i) the logical data chunk; (ii) the priority storage tier (target tier of the user); (iii) the physical memory chunk to be allocated to a default storage tier according to an existing storage system policy; and (iv) the default tier in which the physical chunk is to be allocated. For example, the logical data chunk for storage is identified in sensor sub-system 104 at sensor data store 105. The priority tier is defined by associated metadata as tier 1, a medium-performance tier, such as storage tier 116 (FIG. 1). The system default tier is designated as a high-performance tier such as storage tier 118.

According to some embodiments of the present invention, the write detail mod determines the priority storage tier based on user-intention mapped to a corresponding performance tier. When user intention or need for the data is determined to be hot relative to other stored data, a corresponding high-performance tier is specified in a table, such as priority tier reference table 302 (FIG. 1). In that way, the user intention drives the designation of the priority tier performance level.

Processing proceeds to step S270, where logical configuration mapping mod 370 sets up logical configuration mapping according to the established write details for the dataset. In this example, the configuration mapping mod creates a new mapping entry in the logical configuration map linking the data chunk in sensor data store 105 to storage tiers 116 and 118 according to the write details discussed above.

Processing proceeds to step S275, where comparison mod 375 compares the priority tier to other strategic tiers. In this example, other strategic tiers include: (i) the selected coordinator tier 120; and (ii) the default tier in which the physical chunk is to be allocated; storage tier 118. These strategic tiers are compared to the priority tier, which is, in this example, the medium-performance tier discussed above, storage tier 116. The comparison of the storage tiers provides for a determination as to whether the priority tier is a higher-performance tier or a lower-performance tier than the strategic tiers.

Processing proceeds to step S280, where write mod 380, performs a write process based on the results of the comparison of the priority tier. The various write processes that may be performed are based on the relative performance level of the priority tier with respect to the performance levels of the selected coordinator tier and the performance level of the default tier. As discussed in more detail below, in FIGS. 5-7, depending on the comparison of the performance level of the priority tier, the write process will write to the system-allocated default physical memory or write to directly to the priority tier. In some cases, the comparison will lead to the use of the coordinator tier to accelerate the write process transitioning the logical data chunk to the priority tier through the coordinator tier (FIG. 6).

Some embodiments of the present invention use the logical configuration map of the storage system to maintain a mapping of the logical data chunk storage between the priority tier storage and the coordinator tier storage. As the data storage is copied to the priority tier, the mapping is updated until all the data is stored in the priority tier.

Processing ends at step S285, where mapping mod 385 sets the logical configuration mapping for the identified dataset to the priority tier.

Further embodiments of the present invention are discussed in the paragraphs that follow and later with reference to FIGS. 4-8.

Some embodiments of the present invention are directed to a unified method to write data to a desired storage tier faster than using a write-through approach to storing data. The write-back approach provides faster results than write-through. While using cache is the faster than write-through, the memory is volatile, relatively expensive, and too limited in size for handling large amounts of data writing. The write-through approach uses non-volatile storage but is the slowest for writing, especially for non-SDD storage.

Figure 4:
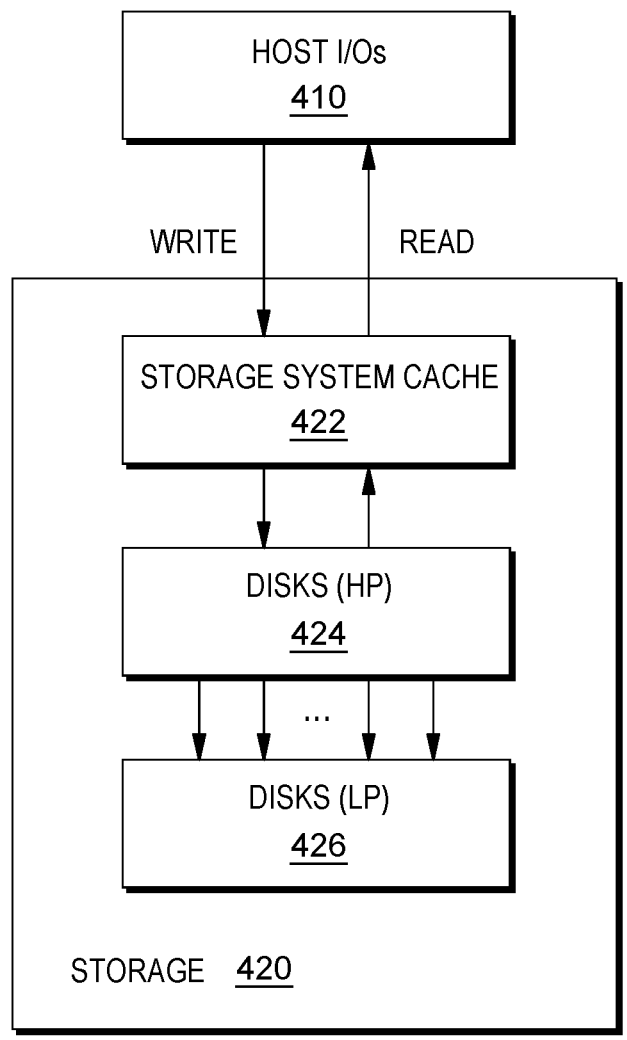
FIG. 4 is a schematic view of a second embodiment of a system according to the present invention.

Referring now to FIG. 4, storage infrastructure 400 includes host computing systems 410 and storage system 420, with storage system cache 422, high performance disks 424, and low performance disks 426. According to some embodiments of the present invention the write process to non-volatile storage takes advantage of a high-performance storage tier to accelerate the write process compared to conventional practices. Some embodiments of the present invention do not require statistical data, do not require a decision algorithm, and/or create fewer high performance temporary chunks than conventional practices.

When referring to FIGS. 5-7 below, the following definitions apply:
   l is a logical data chunk;
   t is the target tier according to user-specific priority;
   T is the coordinator tier assigned accelerating the write process;
   p is the physical chunk allocated, or to-be-allocated, according to a storage system policy;
   tp is the tier in which the physical chunk is located;
   pt is the physical chunk allocated from target tier t; and
   pT is the physical chunk allocated from the coordinator tier T.

According to some embodiments of the present invention, a special case may exist where, when implementing the write process, there is no need to allocate a new extent for the physical chunk, but a previously allocated physical chunk may be reused.

According to some embodiments of the present invention, extent allocation is managed as follows: (i) if the coordinator tier, T, is full, the coordinator tier is set to T+1 and the extents are allocated; (ii) when allocating the physical chunk, p, according to the policy of the corresponding storage system, choose a range where the least copy agents are running and use as many chunks as there are ranges from the desired tier.

Figure 5:
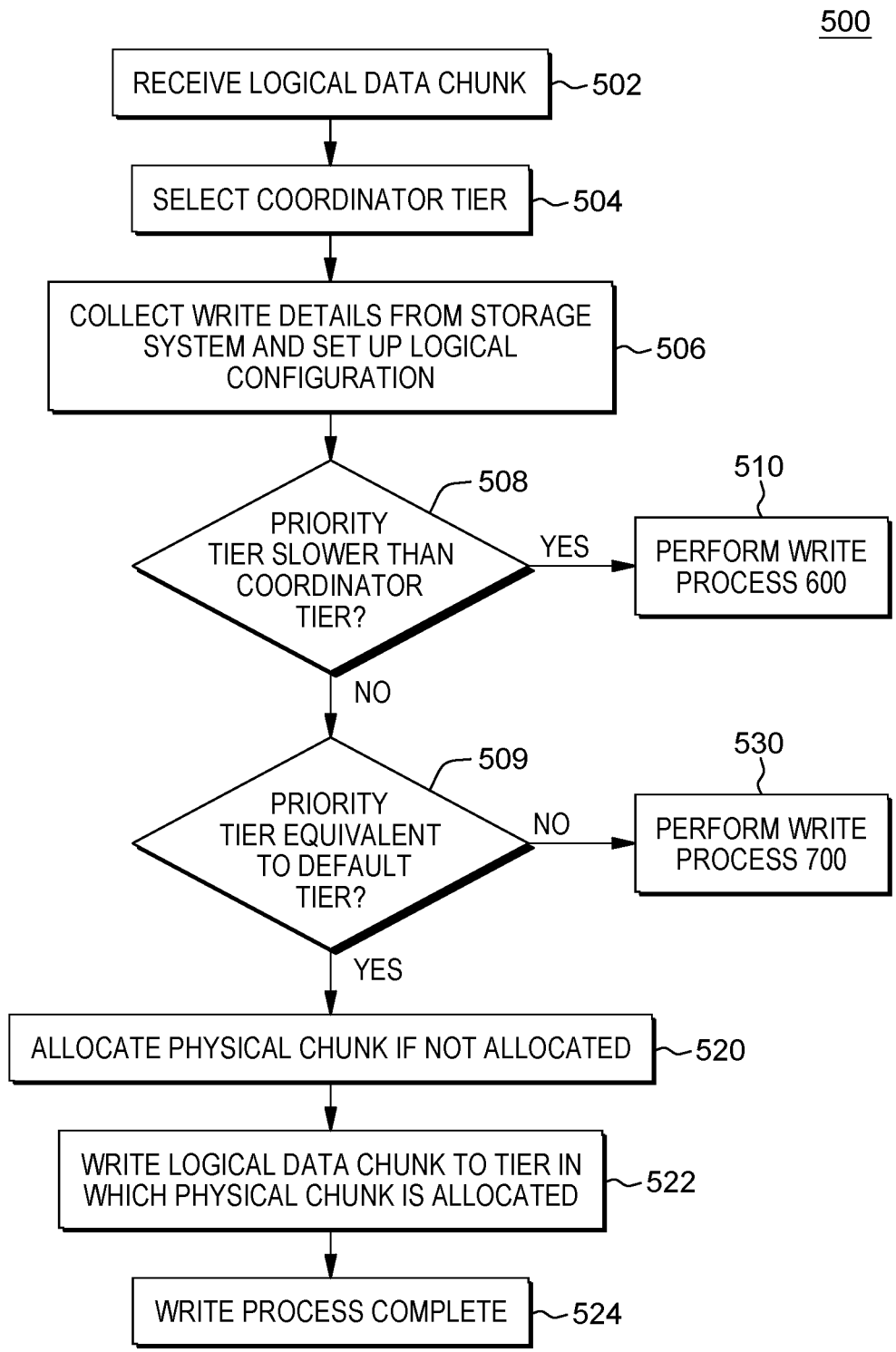
FIG. 5 is a flowchart showing a second method performed in conjunction with the second embodiment system.
Figure 6:
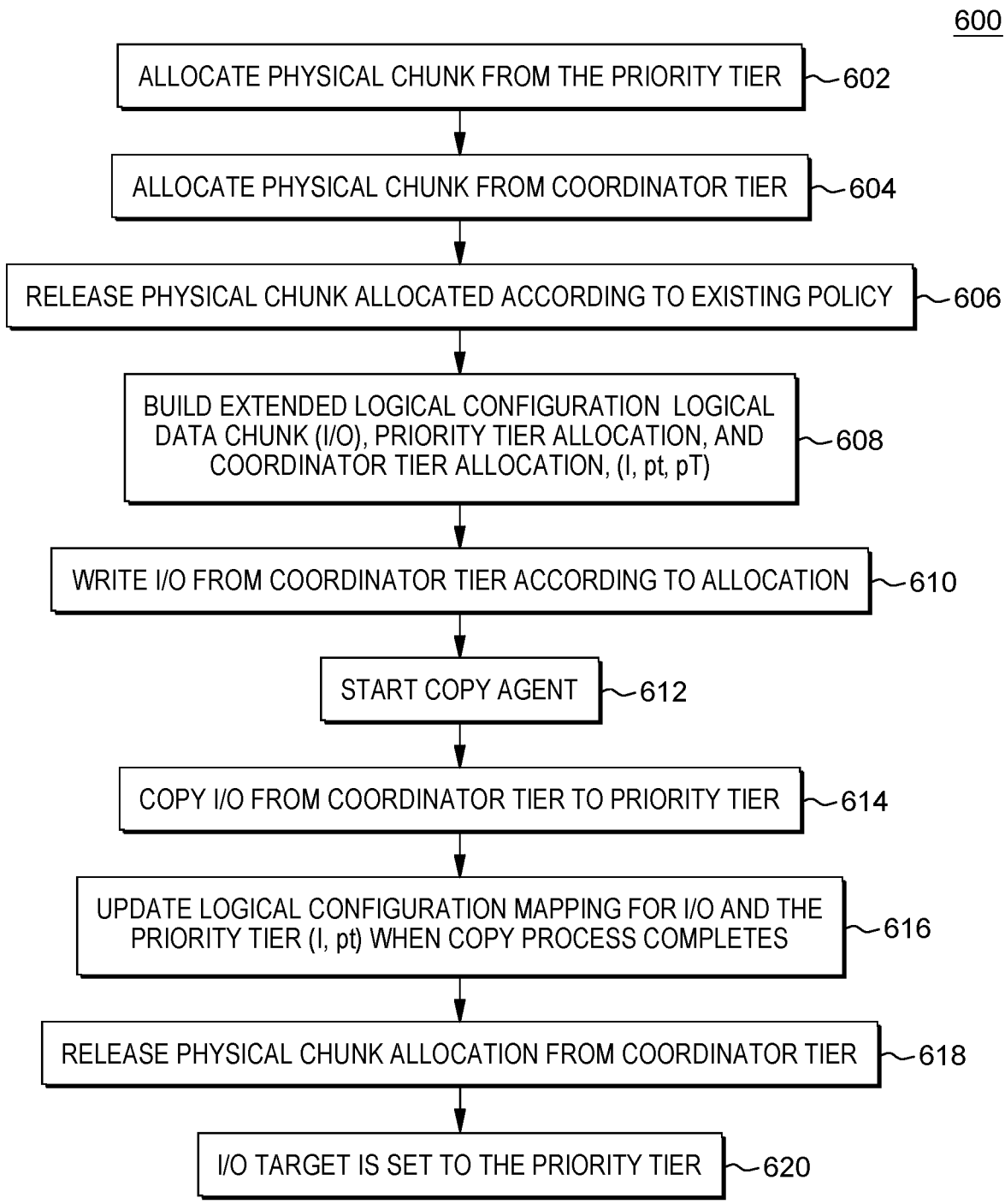
FIG. 6 is a flowchart showing a third method performed in conjunction with the second embodiment system.
Figure 7:
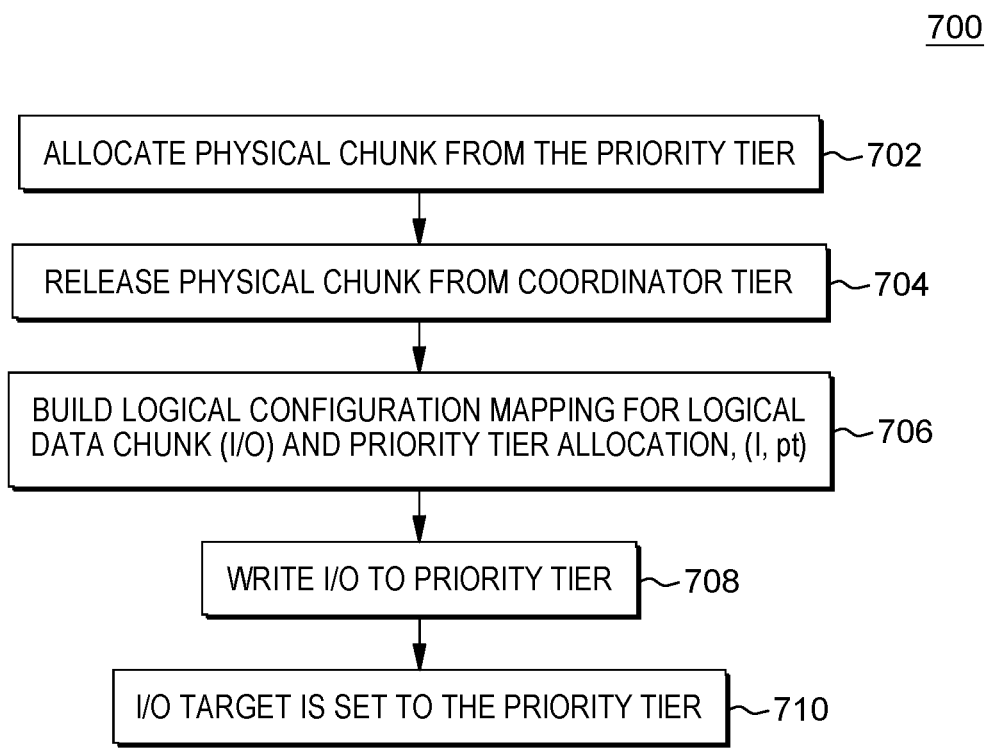
FIG. 7 is a flowchart showing a fourth method performed in conjunction with the second embodiment system.

Referring now to FIG. 5, for a given data chunk l to be written to storage tier t, a method is described in process flows illustrated in overall flowchart 500 and branch flowcharts shown in FIGS. 6 and 7. To write the data chunk (l, t), flowchart 500 operates from the perspective of a multi-tier storage system for optimized write speed taking advantage of certain attributes of both the higher speed tiers and the lower speed tiers of the storage system. The example operations are performed in storage infrastructure 400 (FIG. 4) and may be implemented in a networked computers system such as networked computers system 100 (FIG. 1).

Processing begins at step 502, where a logical data chunk is received. In this example, a user-instructed data chunk (l, t) is received for processing.

Processing proceeds to step 504, where the coordinator tier is selected. In this example, the storage system selects coordinator tier, T, where the default tier is zero, the highest performance storage tier.

Processing proceeds to step 506, where write details are collected from the storage system and logical configuration is set up. In this example, the storage system provides the write details for performing storage for user-instructed data chunk (l, t). The details include: (i) logical data chunk, l; (ii) tier according to user-stated priority, t; (iii) allocation of physical data chunk by system policy, p; and (iv) allocation of physical data chunk from tier t, pt. In view of the write details provided by the storage system, for the logical configuration (l, p), if t is a −1 tier (lowest performance storage tier), then set t to be equal to pt.

Processing proceeds to decision step 508, where a decision is made as to whether the priority tier desired by the user is a storage tier having lower or equal performance when compared to the selected coordinator tier. If the priority tier is a lower or equal performance storage tier, processing follows the "Yes" branch to step 510. If the priority tier is a higher performance storage tier than the selected coordinator tier, processing follows the "No" branch to step 509.

Following the "No" branch to decision step 509, a decision is made as to whether the priority storage tier is equivalent to the default storage tier. In this example, the storage system allocates the physical chunk according to existing allocation policy. The storage tier selected for allocation in that way is referred to herein as the default storage tier. If the priority tier is equivalent to the allocated (or to-be allocated) tier of the physical chunk, the default storage tier, processing follows the "Yes" branch to step 520. If the priority storage tier is faster than the selected default tier, processing follows the "No" branch to step 530.

Following the "Yes" branch to step 520, the physical chunk is allocated to the storage tier selected according to an existing allocation policy. In some embodiments of the present invention, the physical chunk may already be allocated prior to step 520. In this example, allocation has not yet occurred and is allocated to the default storage tier.

Processing proceeds to step 522 where the logical data chunk is written to the default storage tier. In that way, the received logical data chunk is written to the default tier and no further processing is required. The "Yes" branch ends at step 524 when the write process is complete.

Following the "Yes" branch from decision step 508 to step 510, processing proceeds to a method described in flowchart 600 shown in FIG. 6.

Referring now to FIG. 6, which describes a write process when given the logical configuration (l, p), where the priority storage tier t is a −1 tier (lowest performance storage tier) or a storage tier have performance that is less than or equal to the coordinator storage tier, T.

Processing begins at step 602, where a physical chunk of memory is allocated from the priority tier.

Processing proceeds to step 604, where a physical chunk of memory is allocated from the coordinator tier.

Processing proceeds to step 606, where the physical chunk allocated according to the existing storage system policy is released, that is, the physical chunk allocated to the default storage tier is released.

Processing proceeds to step 608, where the storage system builds the extended logical configuration mapping the logical data chunk, referred to herein as I/O data, the priority tier allocation, and the coordinator tier allocation.

Processing proceeds to step 610 where the I/O data is written to the coordinator tier according to the allocation of the physical chunk.

Processing proceeds to step 612 where the copy agent is initiated for copying the logical data chunk from the coordinator tier to the priority tier.

Processing proceeds to step 614 where the I/O data is copied from the coordinator storage tier to the priority storage tier, which is a lower-performance storage tier than the coordinator tier.

Processing proceeds to step 616, where, upon completing a copy process, the storage system updates the logical configuration mapping for I/O data and the priority tier (l, pt).

Processing proceeds to step 618, where the storage system releases the physical chunk allocation from the coordinator tier.

Processing ends at step 620, where the I/O data target is set to the priority tier.

The "No" branch of decision step 508 in FIG. 5 leads to decision step 509, the "Yes" branch of step 509 is discussed above with respect to flowchart 500. Following the "No" branch from decision step 509 to step 530, processing proceeds to a method described in flowchart 700 in FIG. 7.

Referring now to FIG. 7, which describes a write process when given the logical configuration (l, p), where the priority storage tier t is not equal to the default storage tier pt. The performance level of the priority tier, t, being higher performance than the coordinator tier, T, and the priority tier not being an equivalent performance level as the default storage tier.

Processing begins at step 702, where a physical chunk of memory is allocated from the priority tier.

Processing proceeds to step 704, where the storage system releases the physical chunk allocation from the coordinator tier.

Processing proceeds to step 706, where the storage system builds the logical configuration mapping the logical data chunk, referred to herein as I/O data, and the priority tier allocation (l, pt).

Processing proceeds to step 708, where the I/O data is written to the priority tier.

Processing ends at step 710, where the I/O data target is set to the priority tier.

Some embodiments of the present invention are directed to I/O control via an extended logical configuration mapping as follows: (i) when using (l, p), I/O data is routed to p; (ii) when using (l, p, pt), I/O data is routed to pt; (iii) when using (l, p, pT), data has been copied but the copied data is updated before switching to (l, p), I/O data is routed to pT and the updated data is copied to p again; and (iv) when only a few data has not been copied, I/O data is frozen, the remaining data is copied, logical configuration is switched to (l, p), and then I/O data is resumed and is routed to p.

Some embodiments of the present invention are directed to a system and method to accelerate the hybrid storage system write task. Our method firstly maps user intention of data distribution to tiers of the storage system to convert the data to a sequence of tagged data chunks. The storage system compares the desired tier of the chunk with the tier of the selected coordinator. When the desired tier is slow, data is written to the temporary chunk allocated from the coordinator tier first and then copied to the desired tier chunk. The whole sequential write is converted into concurrent copy tasks.

Some embodiments of the present invention use logical configuration mapping to record the relationships between the temporary chunks and final desired chunks during the process. The mapping changes from the original <Logical Address, Physical address> to <Logical address, Desired physical address, Temporary physical address> which exists during the writing and copying, and to <Logical address, Desired physical address> finally when finishing copying all data. The logical configuration routes I/O to <Temporary physical address> if it exists and finally to the <Desired physical address> when accessing the <Logical address> of the data.

According to some embodiments of the present invention, when datasets are written, the storage system has an existing policy and logical configuration map as to which tier level to write the dataset, which is called the default tier level. The default tier level may or may not be the same as the desired tier level set by, or for, the user. The available tier having the best performance for the intended purpose is called the coordinator tier, which may or may not be the same as the default tier level and the desired tier level.

According to some embodiments of the present invention, if the desired tier level is a relatively low-performance tier, lower than the coordinator tier, the logical configuration mapping will be updated in that a new mapping entry is created in the logical configuration map. For example, where the original mapping is $<L1 \rightarrow P1_{DefaultP}>$, the updated mapping will be $<L1 \rightarrow P1_{DesiredP} \rightarrow P2_{CoordinatorP}>$. In this example, a new $P2_{CoordinatorP}$ is added, which means the storage is allocated from the best available high-performance tier. For better performance, the unit of L1 and P1, P2 is not a single physical address (LBA, logical block addressing), but they are in the standard chunk size, such as 16 MB. Then, when the data is written to storage, it is not written to $P1_{DefaultP}$ but it is written to $P2_{CoordinatorP}$ instead. So, the write process is faster because the dataset is being written to a higher-performance tier than the default tier level. When $P2_{HighP}$ is ready, a copy agent is started to copy data from $P2_{HighP}$ to $P1_{LowP}$, copying data from the high-performance tier storage to the low-performance tier storage.

When $P2_{CoordinatorP}$ is fully written with, for example, 16 MB of data, the write process moves to the next standard size chunk of data. As discussed above, it is possible that a new mapping be created $<L2 \rightarrow P2_{DesiredP} \rightarrow P2_{CoordinatorP}>$ and the data is written to the $P2_{CoordinatorP}$. However, at the same time, a chunk of data is allocated from the desired tier and a copy agent is started to copy the data from $P1_{CoordinatorP}$ to $P1_{DesiredP}$ according to the user expectation. The copy process is run at the same time as the data writing process. Because the chunks of data are usually managed by different controllers, their performance is not impacted by the running of the copy process at the same time.

Later, when $P2_{CoordinatorP}$ is fully written, the write may move to $P3_{CoordinatorP}$, and a new copy agent may start copying data from $P2_{CoordinatorP}$ to $P2_{DesiredP}$ and so on until the data writing is completed.

The number of chunks of CoordinatorP and the number of copy agents are not infinite. When all the data is finished being copied from CoordinatorP to DesiredP, the CoordinatorP is released, and the logical configuration mapping is changed back. The copy agent that copies data from the CoordinatorP may also be released if there is no more CoordinatorP to copy or it may be reused again to copy the data from the next CoordinatorP. The number of copy agents can be calculated from the ratio of time to copy a CoordinatorP chunk to the DesiredP chunk compared to the time to write a full CoordinatorP chunk.

After all the target data, or data to be stored, is written to storage locations, the only remaining time needed to finish writing the data to the DesiredP storage tier is the amount of time required for copying a full CoordinatorP data chunk to the DesiredP storage tier.

Figure 8:
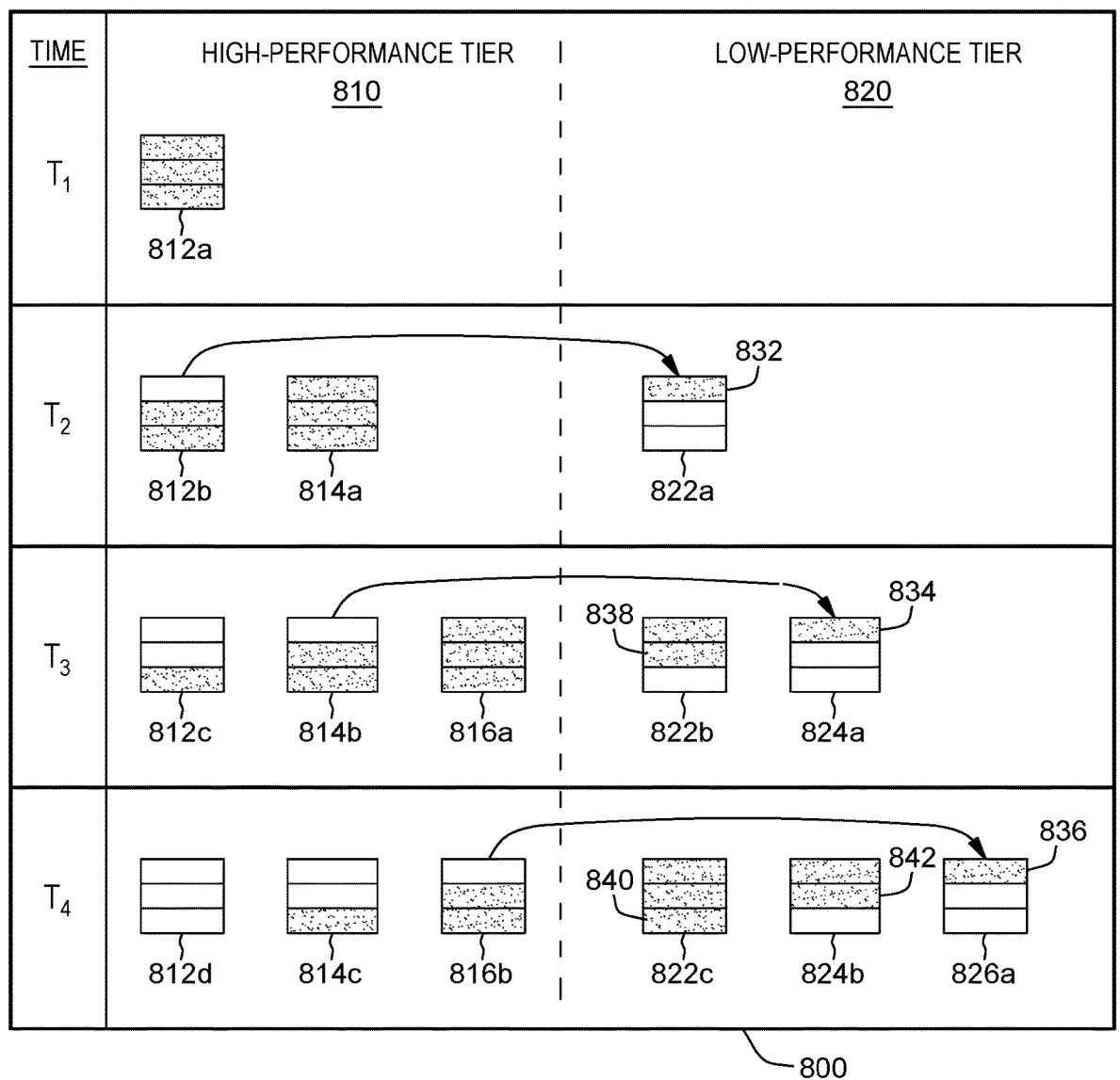
FIG. 8 is a screenshot view showing information that is helpful in understanding embodiments of the present invention.

FIG. 8 depicts screenshot 800 showing a write process in a multi-tiered storage system according to some embodiments of the present invention. Illustrated are high-performance tier 810, the coordinator tier, and low-performance tier 820, the priority tier, at sequential times $T_1$, $T_2$, $T_3$, and $T_4$. At time $T_1$, a first logical data chunk is written to physical memory chunk 812a of the coordinator tier with the written data illustrated as three shaded portions. At time $T_2$, a first copy agent is initiated and first portion 832 of the first logical data chunk is copied from physical memory chunk 812b to physical memory chunk 822a of the priority tier. Also, at time $T_2$, a second logical data chunk is written to physical memory chunk 814a of the coordinator tier.

At time $T_3$, a second copy agent is initiated and first portion 834 of the second logical data chunk is copied from physical memory chunk 814b to physical memory chunk 824a of the priority tier. Further, second portion 838 of the first logical data chunk of physical memory chunk 812c is copied to physical memory chunk 822b of the priority tier. Also, at time $T_3$, a third logical data chunk is written to physical memory chunk 816a of the coordinator tier.

At time $T_4$, a third copy agent is initiated and first portion 836 of the third logical data chunk is copied from physical memory chunk 816b to physical memory chunk 826a of the priority tier. Further, third and final portion 840 of the first logical data chunk of physical memory chunk 812d is copied to physical memory chunk 822c of the priority tier. Accordingly, the first logical data chunk is fully mapped to low-performance tier 820 at physical memory chunk 822c and the physical memory chunk 812d is reusable as an empty physical memory chunk of the coordinator tier. Still further, second portion 842 of the second logical data chunk of physical memory chunk 814c is copied to physical memory chunk 824b of the priority tier.

Some embodiments of the present invention are directed to a simplified process as follows: (i) if the desired tier is the same as the default tier assigned to the data chunk based on existing logical configuration mapping, allocate a chunk from the default tier, if not already allocated, and write the data to the default tier. If the desired tier is different than the default tier, allocate a chunk from the desired tier, update logical configuration mapping to point the logical chunk to the newly-allocated physical chunk and write data to the desired tier. At the same time when writing the data, release the physical chunk from the default tier if it is already allocated.

Some embodiments of the present invention are directed to using multiple copy agents to essentially convert a sequential-write process to a parallel-write process, which greatly improves performance.

A use case for some embodiments of the present invention follows. For M chunks of continuous data to be written to a multi-tiered storage system, compare how much time it will take when using a method described herein with the time it will take by writing data directly to their desired tiers. Some relevant definitions and formulas follow:

TimeT: time to write a chunk to coordinator tier T;

TimeD: time to write a chunk to the desired tier D;

TimeR: time to read a chunk from coordinator tier T;

TimeC: time to copy a chunk from coordinator tier T to desired tier D;

NumOfAgent: number of copy agents;
NumOfChunk: number of chunks reserved from coordinator tier T;
TimeC=TimeR+TimeD=TimeT+TimeD, Given TimeR=TimeT;

Ratio =

$$\text{NumOfAgent} = \text{NumOfChunk} = \frac{\text{TimeC}}{\text{TimeT}} = \frac{\text{TimeT} + \text{TimeD}}{\text{TimeT}} = 1 + \frac{\text{TimeD}}{\text{TimeT}}.$$

To write M chunks:

M≥Ratio+1.

Using existing methods, the process duration is as follows:

M*TimeD.

Using a method disclosed herein, the process duration is as follows:

M*TimeT+TimeC=M*TimeT+(TimeT+TimeD)=((M+1)TimeT)+TimeD.

The saved time using a method disclosed herein is as follows:

M*TimeT+(TimeT+TimeD)=M*TimeD−((M+1)TimeT+TimeD)=(M−1)TimeD−(M+1)TimeT.

Now, applying values, for example, if there are two storage tiers, one with SSD and another with HDD. The SSD throughput is 500 MB/s and HDD throughput is 125 MB/s. The data to be written to the multi-tiered storage system is 60,000 MB. Where the chunk size is 1000 MB, there would be 60 chunks. Further, TimeT=2 s, TimeD=8 s, TimeR=2 s, TimeC=10 s, Ratio=5.

Writing to the storage tier having SSD storage directly requires a process duration as follows:
M*TimeT=120s.

Writing to the storage tier having HDD storage directly requires a process duration as follows:

M*TimeD=480s.

Applying methods of some embodiments of the present invention requires a process duration as follows:

M*TimeT+TimeC=130s.

The time saved by using methods described herein is as follows:

480s−130s=350s.

Applying only five copy agents and five reserved chunks from high performance/coordinator tiers, even more data writes can be performed and the more time it saves. As the number of agents increases, the time used for the writing process comes closes to the time taken to write data directly to coordinator tier T.

Some embodiments of the present invention are directed to formalizing the user intention for data distribution when writing data to a multi-tiered storage system, such as user-based priority for distributing the data.

Some embodiments of the present invention are directed to using extended logical configuration mapping to manage the write process and the I/O during the write process.

Some embodiments of the present invention are directed to converting a sequential write process to parallel writes for accelerating the write task.

Some embodiments of the present invention are directed to using a high-performance tier as a bridge when writing data to a low-performance tier. When the target tier is a low-performance tier, the process divides the written data evenly into chunks and updates the logic configuration mapping to create avatars of the target chunks from the high-performance tier. The data is written to the high-performance tier avatar in sequential mode, and then parallel copy agents are used to copy the written data from the avatars to the actual target locations in the low-performance tier.

Some embodiments of the present invention advantageously use higher performance storage tiers to accelerate writing data to lower performance storage tiers in a multi-tiered storage system.

Some embodiments of the present invention are directed to a storage process including: comparing the desired tier of the chunk with the tier of the selected coordinator; when the desired tier is slow, data is written to the temporary chunk allocated from the coordinator tier first and then copied to the desired tier chunk so that the whole sequential write is converted into concurrent copy tasks; logical configuration mapping is used to record the relationship between the temporary chunk and final desired chunk during the process; the logical configuration mapping changes may be, for example, from the original <Logical Address, Physical address> to <Logical address, Desired physical address, Temporary physical address>, which exists during the writing and copying, and also to <Logical address, Desired physical address> after all the data is finished being copies; and the logical configuration mapping routes I/O to <Temporary physical address> if the address exists and, finally, to <Desired physical address> for access requests to <Logical address> of the data.

Some embodiments of the present invention do more than data management in multiple tiers system, but use a high-performance tier as a buffer to accelerate I/O. Some embodiments of the present invention are directed to a process including the steps: (i) formalizing the user's intention to determine the destination of the data; (ii) using the physical characteristics of the storage disks to determine the number of temporary chunks used in the whole task; (iii) converting the sequential writes to parallel copy tasks; (iv) managing the writing task and I/O by extending the standard logical configuration method used in general storage systems.

Some embodiments of the present invention do not use performance statistics to process write operations that use cache and different tiers of storage, nor to merge and move data, including promotion and demotion among different tiers of storage.

Some embodiments of the present invention are directed to the performance improvement when writing data to a low-performance tier of a multi-tier storage system.

Some embodiments of the present invention use address mapping when writing data to the multi-tier storage system but does not the address mapping not the intermediate high-performance data chunk when copying data is finished.

Some embodiments of the present invention may include one, or more, of the following features, characteristics and/or advantages: (i) provides similar write performance when writing data to a low-performance tier storages as when writing data to a high-performance tier within a multi-tiered storage system; and (ii) limited resources are ensured for the entire writing process; (iii) achieves a much faster write performance when writing data to the low-performance tier.

Some helpful definitions follow:

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

User/subscriber: includes, but is not necessarily limited to, the following: (i) a single individual human; (ii) an artificial intelligence entity with sufficient intelligence to act as a user or subscriber; and/or (iii) a group of related users or subscribers.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method comprising:
   identifying a logical dataset of storage in a multi-tier storage system;
   setting up a logical configuration map of the logical dataset and a priority storage tier having a first performance level;
   selecting a coordinator storage tier having a second performance level in the multi-tier storage system;
   comparing the first performance level of the priority storage tier to the second performance level; and
   performing a write process according to the relative performance level of the first performance level with respect to the second performance levels.

2. The method of claim 1, further comprising:
   identifying a user-based storage priority for the logical dataset; and
   establishing the priority storage tier for the logical dataset according to a reference table assigning user-based storage priority levels to performance levels of the multi-tier storage system.

3. The method of claim 1, wherein:
   the first performance level is lower than the second performance level.

4. The method of claim 3, further comprising:
   allocating a physical memory chunks to both the priority tier and the coordinator tier;
   building an extended logical configuration mapping for the logical dataset, the priority tier allocation, and the coordinator tier allocation;
   writing the logical dataset to the coordinator tier according to the allocation;
   copying the logical dataset from the coordinator tier to the priority tier; and
   responsive to the copying being completed, releasing the physical chunk allocation from the coordinator tier.

5. The method of claim 1, further comprising:
   establishing a set of write details related to the logical dataset, the write details including the priority storage tier and a default storage tier having a third performance level.

6. The method of claim 5, further comprising:
   comparing the first performance level to the third performance level; and
   responsive to the first performance level being equivalent to the third performance level, allocating the physical memory chunk to the default storage tier; and
   writing the logical dataset to the default storage tier.

7. A computer program product comprising a computer-readable storage medium having a set of instructions stored therein which, when executed by a processor, causes the processor to perform a method comprising:
   identifying a logical dataset of storage in a multi-tier storage system;
   setting up a logical configuration map of the logical dataset and a priority storage tier having a first performance level;
   selecting a coordinator storage tier having a second performance level in the multi-tier storage system;
   comparing the first performance level of the priority storage tier to the second performance level; and
   performing a write process according to the relative performance level of the first performance level with respect to the second performance levels.

8. The computer program product of claim 7, further causing the processor to perform a method comprising:
   identifying a user-based storage priority for the logical dataset; and
   establishing the priority storage tier for the logical dataset according to a reference table assigning user-based storage priority levels to performance levels of the multi-tier storage system.

9. The computer program product of claim 7, wherein:
   the first performance level is lower than the second performance level.

10. The computer program product of claim 9, further causing the processor to perform a method comprising:
    allocating a physical memory chunks to both the priority tier and the coordinator tier;
    building an extended logical configuration mapping for the logical dataset, the priority tier allocation, and the coordinator tier allocation;
    writing the logical dataset to the coordinator tier according to the allocation;
    copying the logical dataset from the coordinator tier to the priority tier; and
    responsive to the copying being completed, releasing the physical chunk allocation from the coordinator tier.

11. The computer program product of claim 7, further causing the processor to perform a method comprising:
    establishing a set of write details related to the logical dataset, the write details including the priority storage tier and a default storage tier having a third performance level.

12. The computer program product of claim 11, further causing the processor to perform a method comprising:

comparing the first performance level to the third performance level; and responsive to the first performance level being equivalent to the third performance level, allocating the physical memory chunk to the default storage tier; and writing the logical dataset to the default storage tier.

13. A computer system comprising:

a processor set; and a computer readable storage medium;

wherein:

the processor set is structured, located, connected, and/or programmed to run program instructions stored on the computer readable storage medium; and the program instructions which, when executed by the processor set, cause the processor set to perform a method comprising:

identifying a logical dataset of storage in a multi-tier storage system;

setting up a logical configuration map of the logical dataset and a priority storage tier having a first performance level;

selecting a coordinator storage tier having a second performance level in the multi-tier storage system;

comparing the first performance level of the priority storage tier to the second performance level; and performing a write process according to the relative performance level of the first performance level with respect to the second performance levels.

14. The computer system of claim 13, further causing the processor to perform a method comprising:

identifying a user-based storage priority for the logical dataset; and establishing the priority storage tier for the logical dataset according to a reference table assigning user-based storage priority levels to performance levels of the multi-tier storage system.

15. The computer system of claim 13, wherein:

the first performance level is lower than the second performance level.

16. The computer system of claim 15, further causing the processor to perform a method comprising:

allocating a physical memory chunks to both the priority tier and the coordinator tier;

building an extended logical configuration mapping for the logical dataset, the priority tier allocation, and the coordinator tier allocation;

writing the logical dataset to the coordinator tier according to the allocation;

copying the logical dataset from the coordinator tier to the priority tier; and responsive to the copying being completed, releasing the physical chunk allocation from the coordinator tier.

17. The computer system of claim 13, further causing the processor to perform a method comprising:

establishing a set of write details related to the logical dataset, the write details including the priority storage tier and a default storage tier having a third performance level.

18. The computer system of claim 17, further causing the processor to perform a method comprising:

comparing the first performance level to the third performance level; and responsive to the first performance level being equivalent to the third performance level, allocating the physical memory chunk to the default storage tier; and writing the logical dataset to the default storage tier.

* * * * *